No. 801,646. PATENTED OCT. 10, 1905.
H. CARLSSON.
APPARATUS FOR PREPARING INGOT MOLDS FOR THE CASTING OPERATION.
APPLICATION FILED JUNE 4, 1904.
2 SHEETS—SHEET 1.
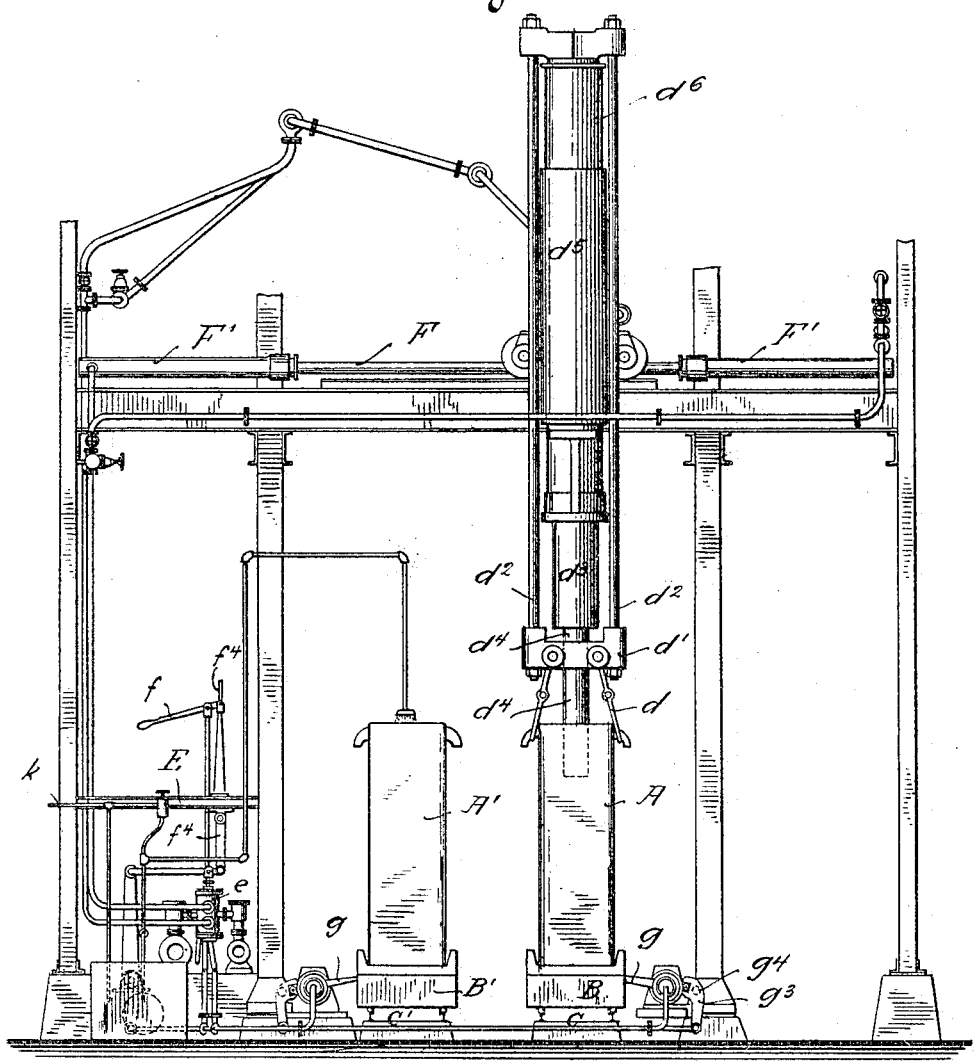

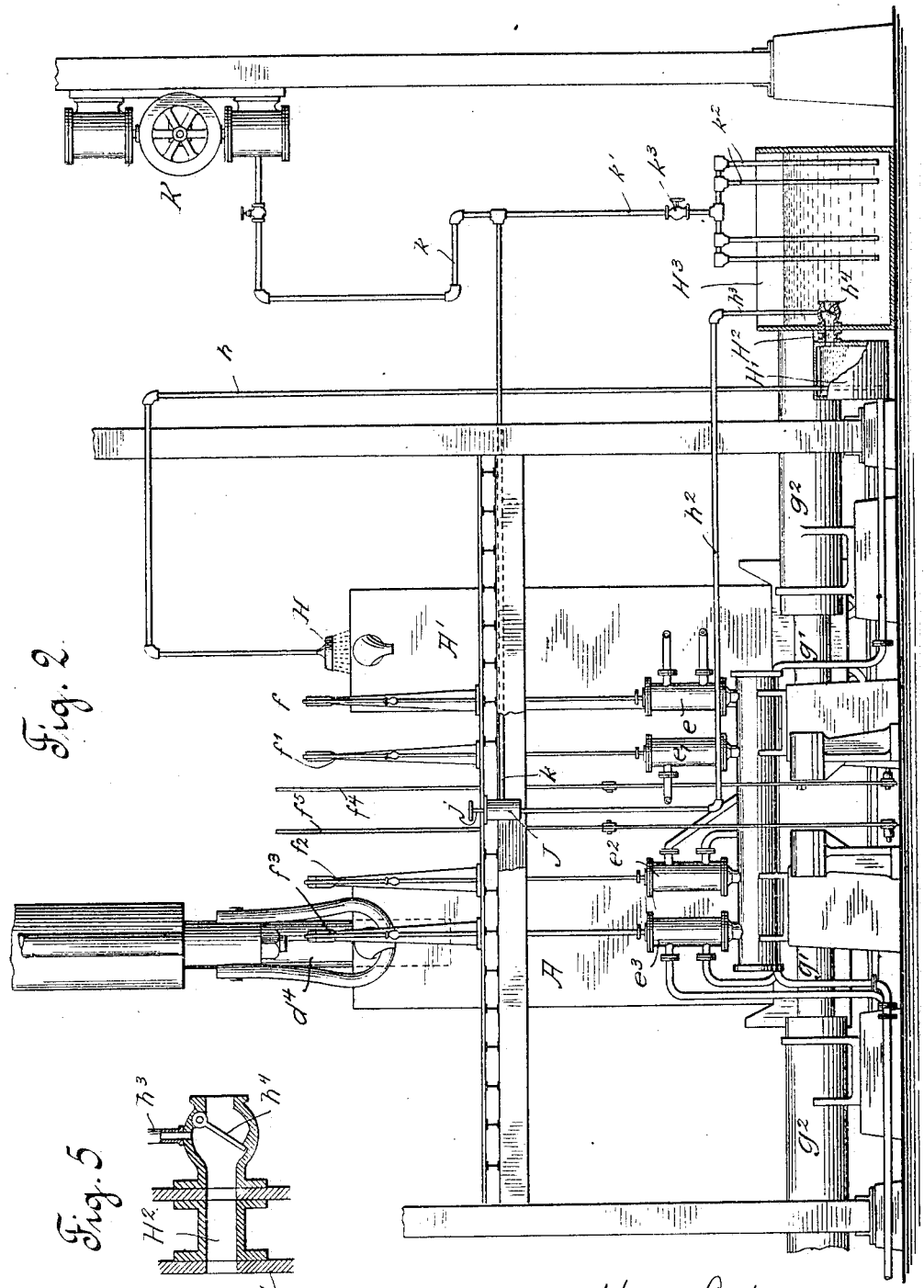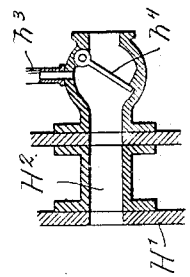

UNITED STATES PATENT OFFICE.

HUGO CARLSSON, OF STOCKHOLM, SWEDEN, ASSIGNOR OF ONE-HALF TO JAMES H. LE FEVRE, OF BUFFALO, NEW YORK.

APPARATUS FOR PREPARING INGOT-MOLDS FOR THE CASTING OPERATION.

No. 801,646.      Specification of Letters Patent.      Patented Oct. 10, 1905.

Application filed June 4, 1904. Serial No. 211,092.

*To all whom it may concern:*

Be it known that I, HUGO CARLSSON, a citizen of the United States, and a resident of Stockholm, Sweden, have invented certain new and useful Improvements in Apparatus for Preparing Ingot-Molds for the Casting Operation, of which the following is a specification.

My invention relates to apparatus for preparing ingot-molds for the casting operation, and has for its object the provision of apparatus by the use of which the molds and stools used to cast steel ingots in and upon may be more effectually and economically prepared to receive the ingots than has hitherto been possible.

It is now a frequent practice in steel plants to line the inside of the molds and the top of the stools with a suitable coating of a material that will reduce the tendency of the steel to stick to the mold and stool and to burn the same. Though the advantage of such a coating in preventing "sticking" and in prolonging the life of molds and stools has long been well known, it is not always applied by steel-makers, because it has been troublesome and expensive to apply such coating to the hot molds and stools, the practice having been to slurry the same by hand. Moreover, this practice has for obvious reasons not given uniform results.

It is the object of my invention to provide in steel plants a means for applying the desired coating uniformly to both molds and stools simultaneously and yet with great economy in labor and to so apply said coating as to substantially form a seal between the rough castings forming the molds and stools. To achieve these ends, I provide a spraying device in connection with a reservoir of the mixture to be applied to the molds and with means to transmit said mixture to the spraying device. This spraying device is so located relative to the tracks for carrying the mold-cars that the molds will pass by the spraying device after the ingots have been removed from the molds, but before the molds have cooled to any substantial extent. A valve or other controlling means regulates the transmission of the liquid. Moreover, I prefer to place the spraying device adjacent the stripping mechanism ordinarily employed in steel mills, the controlling-valve being adjacent to the operating levers or mechanism of the strippers. By this combination the molds are uniformly sprayed while hot, and the spraying is effected by the stripper operator with almost no extra labor.

My invention further consists in the more specific features of the spraying mechanism comprising the means for transmitting and controlling the same, consisting, essentially, of a reservoir containing the proper amount of the liquid for spraying one mold and stool connected through a valve to a source of pressure and automatically filled from a larger reservoir after a mold and stool have been sprayed, as will be explained more fully hereinafter.

Referring to the drawings accompanying this specification, Figure 1 is an end elevation of stripping and spraying mechanisms embodying my invention. Fig. 2 is a side elevation of the same. Figs. 3 and 4 are respectively transverse and horizontal sections of a controlling-valve for the spraying mechanism. Fig. 5 is an enlargement of a portion of the spraying mechanism.

A represents a mold carried by the stool B, which forms part of a car traveling along track C. This mold is supposed to still contain its ingot, which is to be removed by the stripping mechanism. A' represents a similar mold on the stool B' on track C'. This mold A' is empty and is in position to be coated with some suitable material. The molds A and A' of the drawings are not directly opposite each other, but occupy positions in advance of one another, as will be explained.

Stripping mechanisms are well known in the art, and I do not claim any novelty in the stripping mechanism itself, so that it may be very briefly described. The mold A being brought to proper position is engaged by the links $d$, carried by a cross-head $d'$, secured to rods $d^2$ of a hollow plunger $d^6$. Within this plunger is another plunger $d^3$, to which is attached an extension-plunger $d^4$. When water is admitted to the cylinder $d^5$, it acts to push downwardly the plunger $d^4$ to engage the top of the ingot, and at the same time plunger $d^6$ is forced upwardly with the mold A. When the ingot has been extracted in this manner, the stripper and mold A are moved transversely through the agency of water acting on pistons F of cylinders F', and the mold A is then placed on a car on the sprayer-track C'. The vertical and lateral movements of the stripper are controlled by valves $e$ and $e'$, actuated by levers $f$ and $f''$ on the operator's platform.

To bring the mold to an exact position relative to the stripper, I employ a clutch mechanism that engages the car and moves it to a predetermined point. I employ a similar mechanism to move the car with the empty molds to a point exactly beneath the sprayer. These devices comprise arms $g$, swiveled on pistons $g'$, working in cylinders $g^2$, the passage of water to which is controlled by valves $e^2$ and $e^3$, having the operating-levers $f^2$ and $f^3$ located on the operator's platform near the levers $f, f', f^4$ and $f^5$. The cars on the two tracks are pushed by locomotives or similar means until they come within the stroke of pistons $g'$. The operator then causes arm $g$ to engage the car by throwing lever $f^4$ or $f^5$, (one for each track,) which movement is transmitted through the connecting-rods shown to the arms $g^3$, which are pivoted at $g^4$ and have jaws, as shown, which engage projections of arms $g$ and in their movement turn the latter so that they will engage the cars. The operator then moves the proper piston $g'$ by means of lever $f^2$ or $f^3$ far enough to bring the car to the exact position desired. Then by again moving arm $g$ so as to no longer engage the car the piston may be moved to its original position.

The mechanism which I have devised for coating the molds and stools and which I consider preferable comprises a source of compressed air, a pipe system therefrom which includes differently-sized reservoirs of the liquid to be applied, a valve in said pipe system, and a spraying device located above the track, over which the empty molds pass.

H is the spraying device from which the liquid is sprayed, as indicated in the drawings. This spraying device is connected by pipe $h$ with a small closed vessel H', containing a liquid carrying a substance, as lime, adapted to make a suitable lining for the molds. This vessel is made of such a size that it will contain enough liquid to properly line one mold and stool. It is connected by pipe $H^2$, provided with a check-valve $h^4$, with a larger vessel $H^3$, which is open to the atmosphere and contains a large supply of the liquid mixture. By this arrangement vessel H' is always kept full of the liquid mixture, because immediately upon the emptying of the vessel H' valve $h^4$ is opened by the pressure of the liquid in the large reservoir.

The compressed air or other fluid is brought to vessel H' by pipe $h^2$, which connects with the pipe $H^2$ from a valve J, hereinafter more specifically described, which is normally closed. When the operator desires to operate the spraying device, he presses the rod $j$ downward with his foot and allows air to pass through pipe $h^2$ to vessel H', forcing the liquid mixture through pipe $h$ to the spraying device and practically emptying vessel H'. When the pressure is thus applied to vessel H', valve $h^4$ is closed by the pressure in said vessel. When the contents of the vessel and pipe $h$ have been emptied and valve J again closed, the pressure of the liquid in reservoir $H^3$ opens the valve $h^4$, the pressure in H' having been relieved through pipe $h$. The small vessel then fills, air escaping through pipe $H^2$ and thence through the body of the liquid in the reservoir $H^3$, while liquid from the reservoir takes its place and fills the smaller vessel. K indicates a compressor of ordinary construction, and $k$ the pipe connecting the same with valve J.

The valve J is preferably located, as shown, on the platform upon which the stripper operator manipulates the various levers for operating the stripping and clutching mechanism, so that all manipulations relative to the stripping and spraying mechanisms are grouped and can be sequentially carried out by a single operator. A satisfactory form of balanced valve for this purpose is shown in Figs. 3 and 4. The rod $j$ is secured to a tubular member $j'$ and is normally maintained in the position shown in Fig. 3 by a spring $j^2$ engaging member $j'$ and resting on abutment $j^3$. The air enters from pipe $k$ through casing $j^4$. When the rod $j$ is pushed downwardly against the action of the spring, the air enters through the passage $j^5$ of the inner casing $j^6$ and passes out through pipe $h^2$, which is connected to the bottom of the valve. Normally of course the air is prevented from passing through passages $j^5$ by the walls of the tubular member $j'$.

I also provide pipe $k'$, connected with pipe $k$, provided with a valve $k^3$, so that the air-compressor may be placed in communication with pipes $k^2$, that enter the liquid in reservoir $H^3$ and provide a means for agitating the liquid when desired to maintain the solid material in suspension.

While I have described my invention in connection with a specific embodiment thereof illustrated in the drawings, I do not wish to be limited to mere details of construction and arrangement, since I believe my invention to be broadly new, as set out in the claims hereto appended.

Having thus fully described my invention, what I claim, and desire to protect by Letters Patent, is—

1. In a steel plant the combination with a track adapted to be traversed by the ingot-molds, a spraying device above said track and adapted to spray a suitable substance upon the interior of the molds, and means for conveying a measured quantity of said substance to the said spraying device, when desired.

2. In a steel plant, the combination of a track for conveying the ingot-mold-carrying cars, a spraying device above the line of passage of the molds carried by said cars and adapted to spray a measured quantity of a suitable substance upon the inside of the ingot-molds carried by said cars, means for conveying the said substance to said spraying device, and mechanism for controlling the action of said conveying means.

3. In a steel plant, the combination of a track for conveying the ingot-mold-carrying cars, a spraying device above said track and adapted to spray the inside of the ingot-molds with a suitable substance, a reservoir of the said substance in connection with said spraying device, a source of compressed fluid, a pipe therefrom entering said receptacle, and a valve in said pipe for controlling the passage of the fluid therethrough.

4. In a steel plant, the combination of a track for conveying the ingot-mold and ingot-stool-carrying cars, a spraying device adjacent to the line of passage of the molds carried by said cars and adapted to spray a measured quantity of a suitable substance upon the inside of the ingot-molds and simultaneously onto the said stools carried by said cars, means for conveying such substance to said spraying device and mechanism for controlling the said conveying means.

5. In a steel plant, the combination of a track for conveying the ingot-mold and ingot-stool-carrying cars, a spraying device adjacent to the line of passage of the molds carried by said cars and adapted to spray the inside of the ingot-molds and the top of the ingot-stools with a suitable substance, a reservoir of the said substance in communication with said spraying device, a source of compressed fluid, a pipe therefrom entering said receptacle, and a valve in said pipe for controlling the passage of the fluid therethrough.

6. A mechanism for lining ingot molds and stools, comprising the combination of a source of compressed fluid, a vessel containing the liquid to be sprayed, means for automatically supplying liquid to said vessel, a pipe connecting said vessel with the said source of compressed fluid, a valve in said pipe, and a spraying device in communication with said vessel.

7. A mechanism for lining ingot-molds comprising the combination of a source of compressed fluid, a vessel containing the liquid to be sprayed, a pipe connecting said vessel with the said source of compressed fluid, a normally closed valve in said pipe, a spraying device in communication with said vessel, and means for automatically supplying said vessel with liquid after a mold has been sprayed.

8. A mechanism for lining ingot-molds, comprising a source of compressed fluid, a pipe leading therefrom, a valve in said pipe, a reservoir containing a suitable liquid, a smaller vessel connected thereto and to the said pipe, and a spraying device in communication with said smaller vessel.

9. A mechanism for lining ingot-molds comprising a source of compressed fluid, a pipe leading therefrom, a valve in said pipe, a reservoir containing a suitable liquid, a smaller vessel connected thereto and to the said pipe, a spraying device in communication with said smaller vessel, and pipes from the source of compressed fluid entering the said reservoir to agitate the contents of the same.

10. In a steel plant, the combination of a track, mold-carrying cars thereon, a stripping mechanism above said track, controlling devices for said stripping mechanism, a second track adjacent to the said track, a spraying device above said second track, pipes leading thereto for conveying the liquid to be sprayed, a source of compressed fluid, a pipe therefrom to the liquid to be sprayed, and a valve in said pipe where adjacent to said controlling devices.

11. A mechanism for lining ingot-molds comprising a source of compressed fluid, a pipe leading therefrom, a valve in said pipe, a reservoir containing a suitable liquid, a smaller vessel connected thereto and to the said pipe, a connection from said pipe entering the reservoir, and a spraying device in communication with said smaller vessel.

12. A mechanism for lining ingot-molds comprising a source of compressed fluid, a pipe leading therefrom, a valve in said pipe, a reservoir containing a suitable liquid, a smaller vessel connected thereto and to the said pipe, a connection from said pipe entering the reservoir, a spraying device in communication with said smaller vessel, and pipes from the source of compressed fluid entering the said reservoir to agitate the contents of the same.

13. A mechanism for lining ingot-molds comprising the combination of a source of compressed fluid, a vessel containing the proper quantity of liquid to be applied to a mold, a reservoir of liquid normally in communication with said vessel, a pipe connecting the said vessel with the said source of compressed fluid and a valve therein, a spraying device in communication with said vessel, and a pressure-actuated valve between the vessel and reservoir.

14. A mechanism for lining ingot-molds comprising a spraying device, a vessel in communication therewith and of such size as to be substantially filled by the quantity of liquid which is to be applied to a mold, means for conveying the contents of said vessel through said spraying device, and means for filling said vessel after it has thus been emptied.

In testimony whereof I have signed my name to this specification in the presence of two subscribing witnesses.

HUGO CARLSSON

Witnesses:
RICHARD EYRE,
JOHN O. GEMPLER.